(12) United States Patent
Ng et al.

(10) Patent No.: US 7,190,440 B2
(45) Date of Patent: Mar. 13, 2007

(54) CONTROLLING COMPRESSIVE FORCE USING PRESSURE SENSITIVE FILM

(75) Inventors: Hwa Liang Ng, Singapore (SG); Kian Seng Neo, Singapore (SG); Kok Leong Quah, Singapore (SG); Terence Chee Kwong Cheng, Singapore (SG)

(73) Assignee: Seagate Technology, LLC, Scotts Valley, CA (US)

(*) Notice: Subject to any disclaimer, the term of this patent is extended or adjusted under 35 U.S.C. 154(b) by 273 days.

(21) Appl. No.: 10/618,411

(22) Filed: Jul. 11, 2003

(65) Prior Publication Data

US 2004/0050173 A1 Mar. 18, 2004

Related U.S. Application Data

(60) Provisional application No. 60/411,293, filed on Sep. 17, 2002.

(51) Int. Cl.
*G01B 11/16* (2006.01)
(52) U.S. Cl. .......................... 356/32; 73/762
(58) Field of Classification Search ........... 356/32; 73/762
See application file for complete search history.

(56) References Cited

U.S. PATENT DOCUMENTS

| | | | |
|---|---|---|---|
| 3,575,137 A | 4/1971 | Marquis | |
| 3,647,504 A | 3/1972 | Hayes, Jr. et al. | |
| 3,959,881 A | 6/1976 | Kokal, Jr. | |
| 4,078,423 A | 3/1978 | Ogata et al. | |
| 4,132,112 A * | 1/1979 | Hosoi et al. | 503/200 |
| 4,142,404 A | 3/1979 | Ogata et al. | |
| 4,322,979 A | 4/1982 | Fromm | |
| 5,395,239 A | 3/1995 | Komatsu et al. | |
| 5,454,629 A | 10/1995 | Johnson | |
| 5,474,967 A | 12/1995 | Komatsu et al. | |
| 5,773,080 A | 6/1998 | Simmons et al. | |
| 6,115,930 A | 9/2000 | Shigyo | |
| 6,336,275 B1 | 1/2002 | Shigyo | |
| 6,477,447 B1 | 11/2002 | Lin | |
| 6,512,387 B1 * | 1/2003 | Bohn | 324/754 |

OTHER PUBLICATIONS

Szweda, Roy, "Tactile sensor interprets stress distribution and magnitude in O-rings and gaskets", Sealing Technology, vol. 2001, issue 90 (Jun. 2001), pp. 6-7.*
Sensor Products, Inc. literature at www.sensorprod.com.

* cited by examiner

*Primary Examiner*—Richard A. Rosenberger
(74) *Attorney, Agent, or Firm*—Westman, Champlin & Kelly, P.A.

(57) ABSTRACT

A film is placed between contacting surfaces in an assembly. The film has an optical property responsive to pressure. A compressive force is applied to the contacting surfaces to generate an initial pressure pattern. The film is removed from between the contacting surfaces. The optical property is sensed to derive a sensed initial pressure pattern. A stored setting controls the compressive force. The sensed initial pressure pattern is compared to a reference pressure pattern. The stored setting is updated to adjust the compressive force as a function of the comparing.

28 Claims, 11 Drawing Sheets

CONTROLLING COMPRESSIVE FORCE USING PRESSURE SENSITIVE FILM

CROSS-REFERENCE TO RELATED APPLICATION

This application claims priority from U.S. Provisional Application 60/411,293 filed on Sep. 17, 2002 for inventors Hwa Liang Ng, Kian Seng Neo, Kok Leong Quah, and Terence Chee Kwong Cheng and entitled "Method of measuring compression force in the assembly of a hard disc drive using pressure sensitive film."

FIELD OF THE INVENTION

The present invention relates generally to controlling compressive force, and more particularly but not by limitation to controlling compressive force in manufacturing assemblies such as disc drives.

BACKGROUND OF THE INVENTION

Precision mechanical assemblies, particularly sealed assemblies, can include a number of mating or contacting surfaces where controlled pressure needs to be uniformly applied in order to optimize performance of the precision mechanical assembly and avoid distortion or misalignment of components in the assembly.

Resilient materials such as gaskets, O-rings and seals of various kinds need to be compressed uniformly in order to ensure sealing. If a compressive force that is too small is applied to part of a mating surface, the resilient materials will not conform adequately to a sealing surface, and a leak will result. If a compressive force that is too large is applied to part of a mating surface, the surface itself can warp, and again a leak will result.

Various precision moving parts need to be clamped or secured by use of a controlled compressive force, however, excessive amounts of compressive force can warp moving parts and the resulting misalignment with other parts can cause malfunctions. In particular, magnetic storage devices such as disc drives require precisely controlled pressure patterns between contacting surfaces in order to securely align components and provide air tight seals. It is found, however, that production equipment can go out of adjustment, resulting in rejection of products on the assembly line.

A method and apparatus are needed that can set compressive forces to control pressure patterns in mass production of precision assemblies. Embodiments of the present invention provide solutions to these and other problems, and offer other advantages over the prior art.

SUMMARY OF THE INVENTION

A method and apparatus for setting a compressive force in an assembly are disclosed. A film is placed between first and second contacting surfaces in the assembly. The film has an optical property responsive to a pressure pattern between the first and second contacting surfaces. The compressive force is provided at an initial level to the first and second contacting surfaces to generate an initial pressure pattern. The compressive force is removed and the film is removed from between the first and second contacting surfaces. The optical property is sensed to derive a sensed initial pressure pattern. A stored setting controls the compressive force. The sensed initial pressure pattern is compared to a reference pressure pattern. The stored setting is updated to adjust the compressive force as a function of the comparing.

Other features and benefits that characterize embodiments of the present invention will be apparent upon reading the following detailed description and review of the associated drawings.

DETAILED DESCRIPTION OF ILLUSTRATIVE EMBODIMENTS

Hard disk drives are sealed to prevent contamination from dust and other particles that are normally present in the air. There are stringent requirement on leakage rates which are affected by the sealing capability of labels and fasteners on the disc drive housing. The sealing quality of the labels and gaskets are very dependent on the assembly and testing processes to maintain a uniform pressure distribution.

In the case of a metal label with pressure sensitive adhesive that serves to seal openings in the disc drive housing, adjustment of compression force from rollers in a production fixture is critical. A practical way of quantitatively measuring a pressure distribution across the label surfaces is needed.

Compression of top cover gaskets and printed circuit cable header gaskets is sensitive to fastener torque, location of fastening points and other parameters. Improper design of fastening points results in uneven pre-compression of the gasket. A quantitative method is needed for making design changes and adjusting manufacturing equipment.

Leak-rate testers on the assembly line have test probes that connect the disc drive housing to a test sensor. Conditions of the test probe gasket contributes to the apparent leak-rate as well. Again compression force needs to be quantified to fine-tune the design of the test probe.

The compressive force on disc clamps needs to be precisely adjusted to avoid looseness or distortion (conning) of the disc that is secured by the disc clamp.

Embodiments described below in connection with FIGS. 2–15 provide solutions to the above problems and many widely varying manufacturing problems involving controlling or setting a compressive force to maintain uniform pressure distributions between contacting surfaces in assemblies.

Figure 1:
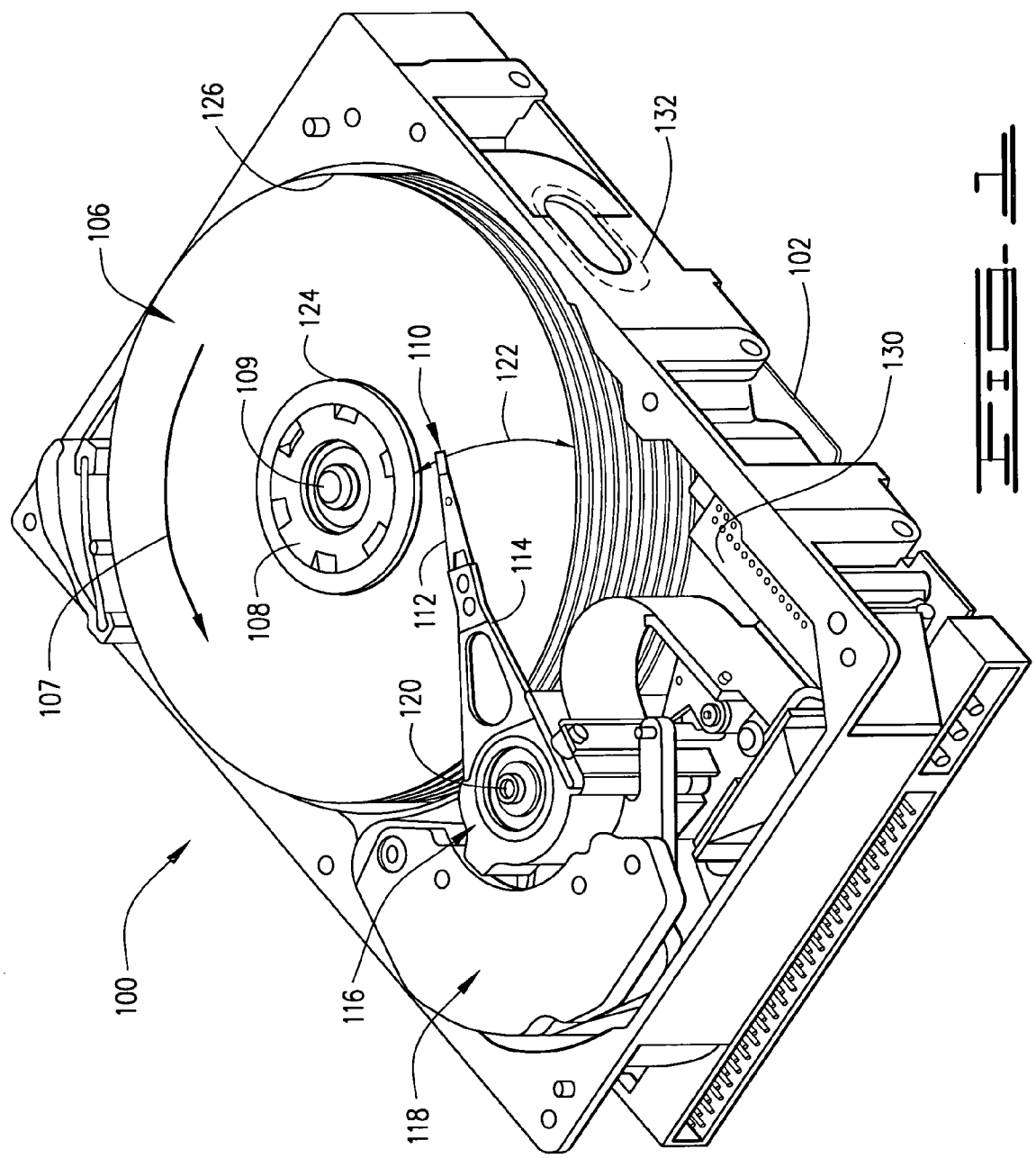
FIG. 1 illustrates an oblique view of a disc drive.

FIG. 1 illustrates an oblique view of a disc drive 100 in which embodiments of the present invention are useful for adjusting pressures between mating surfaces. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown). The base 102 includes an external surface 132 that surround a hole. The external surface 132 is used as a sealing surface that mates with a gasket on a leak tester probe.

Figure 2:
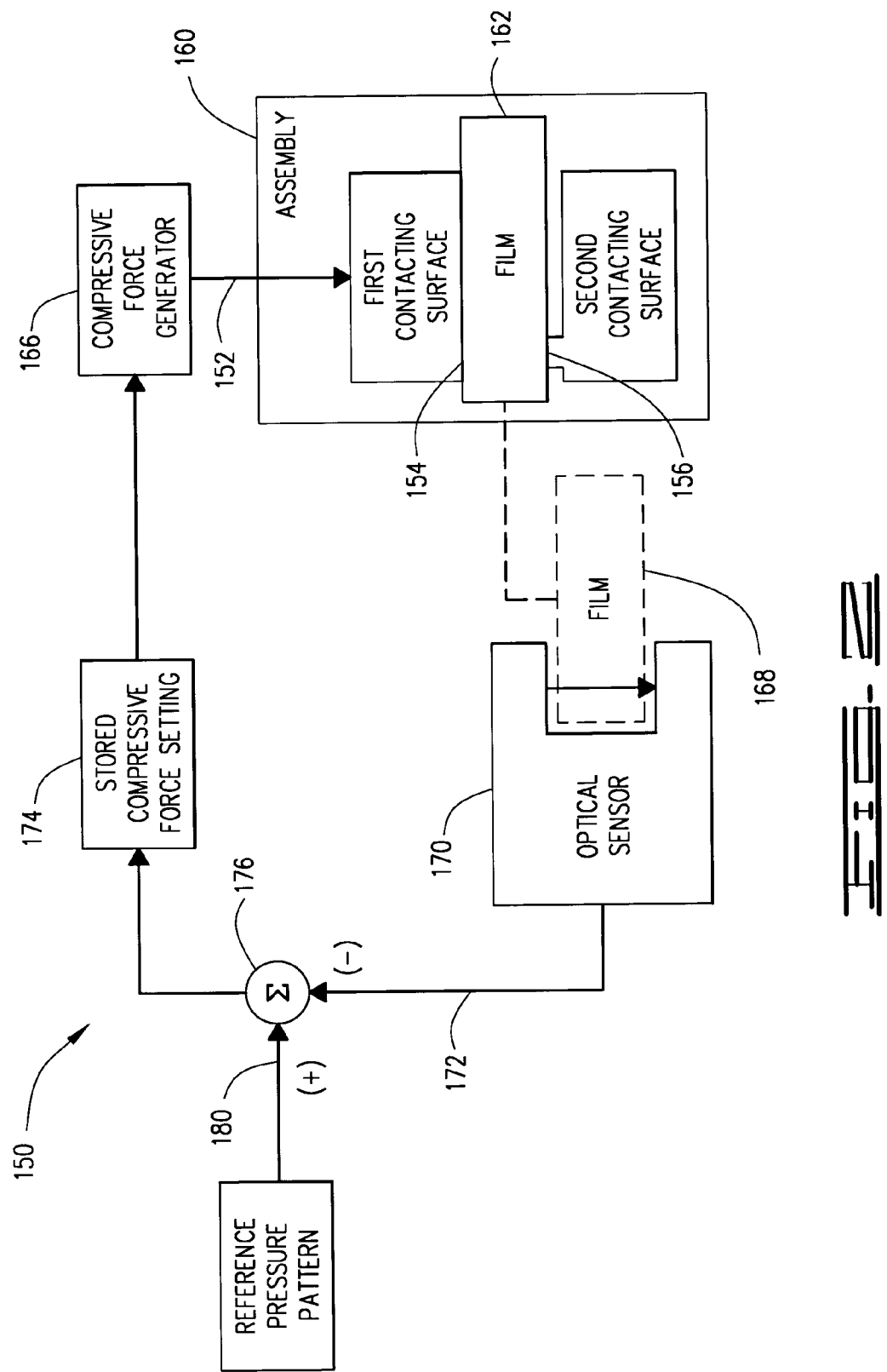
FIG. 2 illustrates a block diagram of an apparatus for controlling compressive force in an assembly.

FIG. 2 illustrates a block diagram of an apparatus 150 that sets a compressive force 152 between a first contacting surface 154 and second contacting surface 156 in an assembly 160. The assembly 160 is typically one of a series of products produced on an automated assembly line. The assembly 160 typically depends on a correct amount of compressive force to optimize a quality of its operation.

A film 162 is placed between the first and second contacting surfaces 154, 156. The film 162 has an optical property that responds to a pressure pattern between the first and second contacting surfaces 154, 156. The film 162 is preferably transparent before application of pressure. The optical property is preferably optical density which increases irreversibly with increasing pressure in a pressure measurement range. In one preferred arrangement, the change of optical density is present immediately after application of pressure. In another preferred arrangement, the change in optical density is completed by developing the film using a film development process. Alternatively, the optical property can be optical reflectance.

A compressive force generator 166 applies the compressive force 152 at an initial level to the first and second contacting surfaces 154, 156 to generate an initial pressure pattern. Portions of the film 162 that are not subjected to pressure have an optical property that is unaffected, and portions of the film 162 that are subjected to pressure have an optical property that is affected. The optical property preferably changes in a monotonic or linear manner over a pressure measurement range to provide a continuous analog indication of maximum pressure.

After an initial test interval, the compressive force 152 is removed from the assembly 160 and the film 162 is removed from the assembly and placed at location 168 where it can be accessed by an optical sensor 170. The optical sensor 170 senses the optical property to derive a sensed initial pressure pattern 172. The optical sensor 170 is typically a scanning densitometer and the sensed initial pressure pattern 172 is typically a bitmap of optical density over a surface area of the film 162 that includes at least portions of the film 162 that were pressurized by the first and second contacting surfaces 154, 156.

A stored setting 174 couples to the compressive force generator 166 and is used to control the compressive force 152. A comparator 176 receives the sensed initial pressure pattern 172 and a reference pressure pattern 180 and updates the stored setting 174 to adjust the compressive force 152 as a function of the comparing. The comparator 176 is typically realized by a computer (not illustrated in FIG. 2) that also stores the reference pressure pattern 180 and the stored compressive force setting 174. In a preferred arrangement, the comparator 176 performs statistical process control functions so that the stored compressive force setting 174 changes in response to shifts in average density to maintain a tight normal distribution of sensed pressure patterns 172 over time.

The apparatus 150 illustrated in FIG. 2 can be applied to a wide variety of manufacturing processes in which compressive force is critical to operation of an assembly 160. A number of examples of applications in the area of computer disc drive manufacture are described below in connection with FIGS. 3–15.

Figure 3:
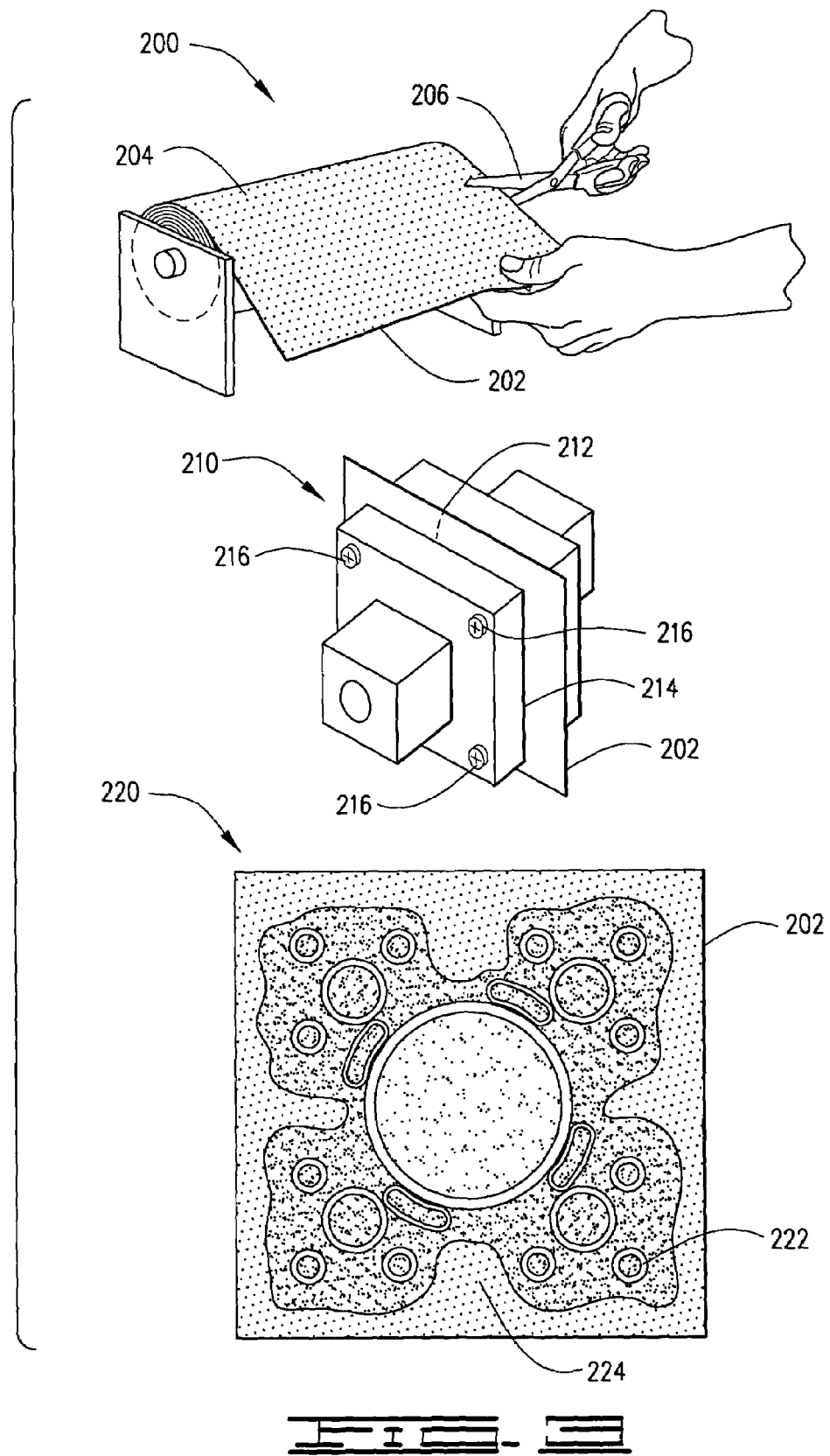
FIG. 3 illustrates process steps in recording pressure information on a film that has an optical property sensitive to pressure patterns.

FIG. 3 illustrates process steps in recording pressure information on a sheet of film that has an optical property sensitive to pressure patterns. At process step 200, a sheet of film 202 is cut from a film roll 204 using a scissors 206. At process step 210, the sheet of film 202 is placed between mating surfaces of two contacting components 212, 214. Fasteners 216, such as screws or bolts, are then tightened to a measured torque in order to apply a compressive force to the assembly of contacting components 212, 214. The compressive force is spread over the area of the mating surfaces and produces an initial pressure pattern between the mating surfaces. The compressive force is then removed, the parts are separated and the sheet 202 is removed. The sheet 202 has its optical properties modified by the pressure pattern as illustrated at 220. The optical property is preferably density.

The pattern of optical density on the film 202 is representative of the maximum pressure experienced at each location on the film 202. Regions of pressure concentrations are identifiable by denser regions such as circular pattern 222.

Regions of low pressure are identifiably by less dense or translucent regions such as 224.

Figure 4:
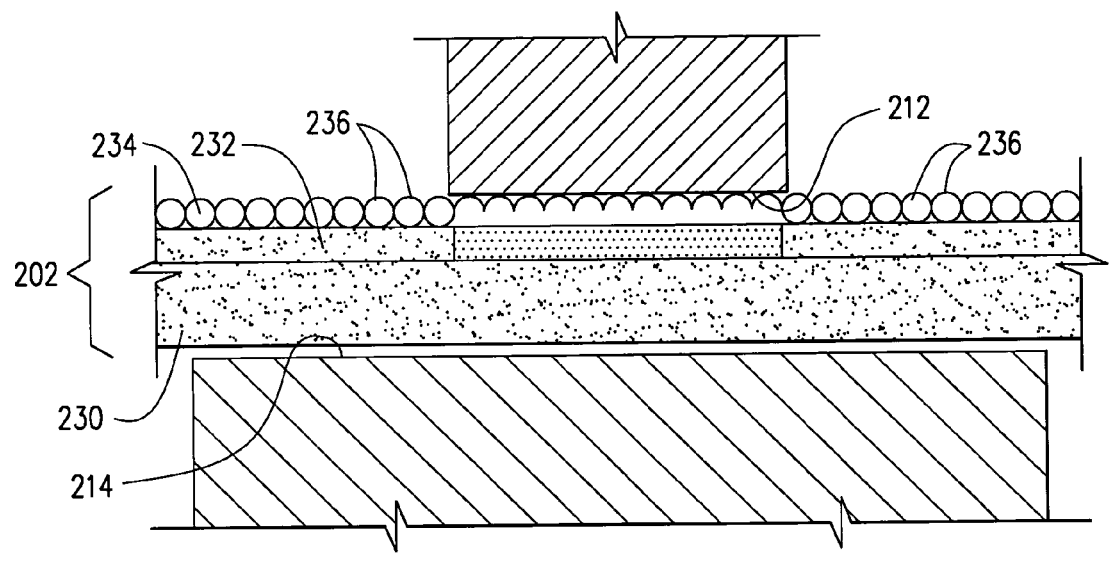
FIG. 4 illustrates an enlarged cross-sectional view of a small portion of the arrangement such as the one shown in FIG. 3.

FIG. 4 illustrates an enlarged cross-sectional view of a small portion of the arrangement such as the one shown at 210 in FIG. 3. The film 202 is compressed between the contacting surfaces 212, 214. The film 202 includes a polyester base layer 230 supporting a color forming layer 232. A color developing layer 234 is supported on top of the color forming layer 232. The color developing layer 234 is made up of microscopic capsules 236 that break open when subjected to pressure. Chemicals in the microcapsules develop the underlying portion of the color forming layer 232 in proportion to the amount of pressure that is applied. The developed film 202 provides an indication of compressive force and pressure distribution. BumbleBee Laboratories PTE LTD, 133 New Bridge Road #25-08, Chinatown Point, Singapore supply extremely thin and stable film that senses pressure. The film 202 preferably is thin, less than 120 micrometers, so that the film thickness does not affect the sensing accuracy. A mono-sheet type (90±5 micrometer thickness) or a two-sheet type (110±5 micrometer thickness) can be used. Darkened regions appear on the film when pressure is applied. The color density changes according to Pressure (Force intensity) level. A preferred range is a density of 0.1–1.4. Five kinds of films are available to measure a wide pressure range. (0.2–130 MPa.) This technique allows hard-disk drives designer and machine automation design engineers to verify the pressure distribution and make necessary adjustment in a quantitative and predictable manner. The arrangement shown in FIG. 4 can represent a variety of contacting surfaces such as a disc drive cover and cover gasket, a printed circuit header gasket and through hole, a leak tester probe gasket and a surface surrounding a test hole on a disc drive base, a disc clamp and a disc or other contacting surfaces where pressure is to be controlled.

Figure 5:
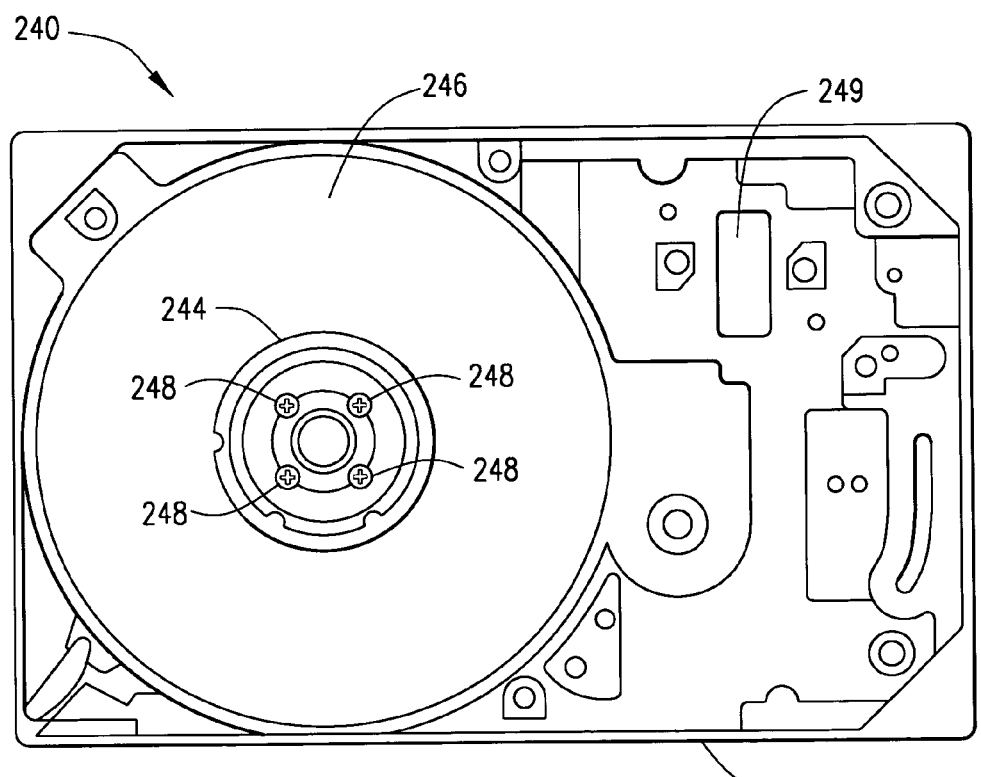
FIG. 5 illustrates a top disc surface and a disc clamp assembly in a partially assembled disc drive.

FIG. 5 illustrates a partially assembled disc drive 240 that includes a die cast base 242, disc clamp 244, a disc 246, and fasteners 248 that provide a compressive force to the disc clamp 244. The disc clamp 244 holds the disc 246 in a precisely centered position. A manufacturing tool (not illustrated) applies a calibrated torque to each of the fasteners 248 in an effort to provide a uniform pressure pattern between the mating (contacting) surfaces of the disc 246 and the disc clamp 244. An enlarged cross-sectional view of the mating surfaces of the disc 246 and the disc clamp 244 is illustrated in FIG. 6.

The cast base 242 includes a through hole 249. The through hole 249 is sealed in a later assembly step by a printed circuit cable header and cable header gasket as described in more detail below in connection with FIG. 11.

Figure 6:
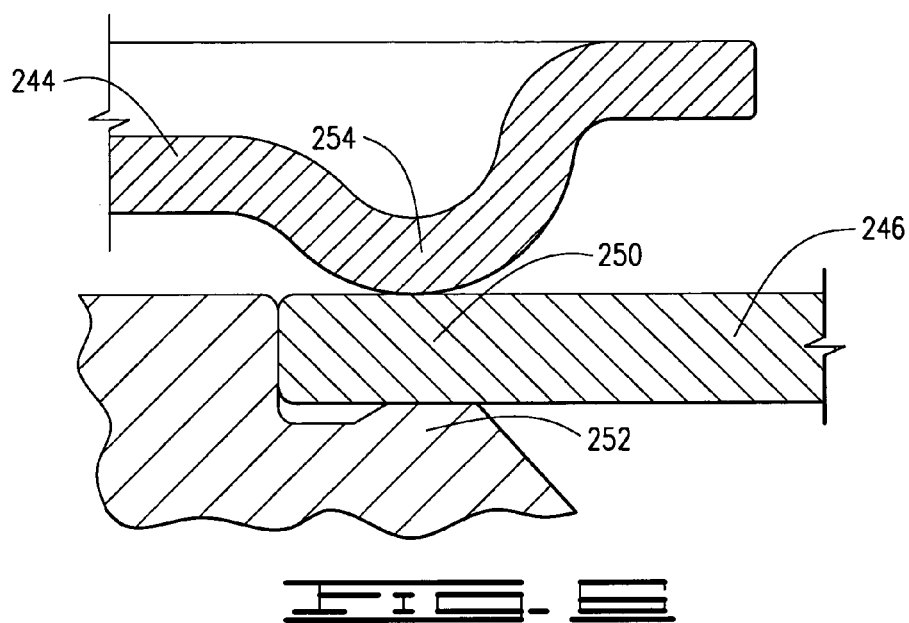
FIG. 6 illustrates an enlarged view of a disc drive motor flange, a disc and a disc clamp.

In FIG. 6, reference numbers that are the same as reference numbers used in FIG. 5 identify the same features. The disc 246 includes an inner rim 250 that has a lower surface that rests on a central hub 252 of a drive motor (not illustrated). The disc clamp 244 includes an annular protrusion 254 that contacts an upper surface of the inner rim 250. Fasteners 248 (FIG. 5) pass through the disc clamp 244 and are secured in threaded holes (not illustrated) in the central hub 252. Fasteners 248 are tightened and produce a clamping or compressive force that holds the disc 246 securely in place. When the correct amount of force is applied to the disc clamp 244 and the disc clamp distributes the force uniformly to provide a uniform pressure pattern under the annular protrusion 254, then the disc 244 is relatively free of distortion, also called conning. If the compressive force is too low, the disc 246 may slip. If the compressive force is too high, the disc 246 may distort. An initial pressure pattern can be produced by assembling a sheet of film between the annular protrusion 254 and the inner rim 250, tightening the fasteners 248, disassembly and comparison of a sensed initial pressure pattern on the sheet of film to a reference pressure pattern. The sensing is preferably made by using an optical densitometer to sense the optical density on the sheet of film.

Figure 7:
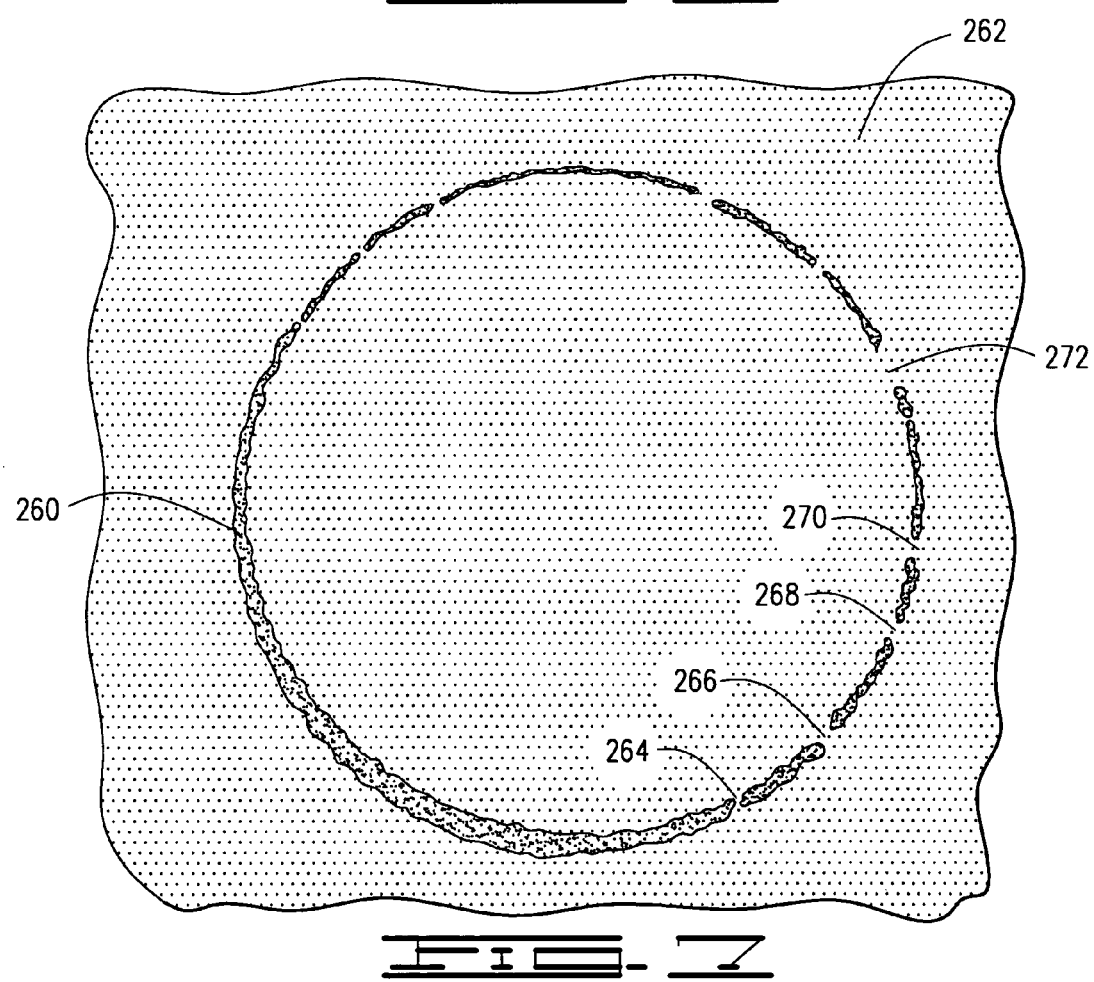
FIG. 7 illustrates an enlarged view of a film that has been subjected to a pressure pattern between a disc and a disc clamp.

In FIG. 7, a sensed pressure pattern 260 on a sheet of film 262 is illustrated. The sensed pressure pattern 260 is not a uniform annular pressure pattern, but includes discontinuities 264, 266, 268, 270, 272. Once the non-uniformity is found by comparison to a reference pressure pattern, then the sources of the discontinuities can be diagnosed, manufacture can be appropriately adjusted, and a further pressure pattern can be produced to verify that the problem causing the discontinuity has actually been corrected. Equipment for performing the comparison of the initial pressure pattern to a reference pressure pattern is illustrated in FIG. 8.

Figure 8:
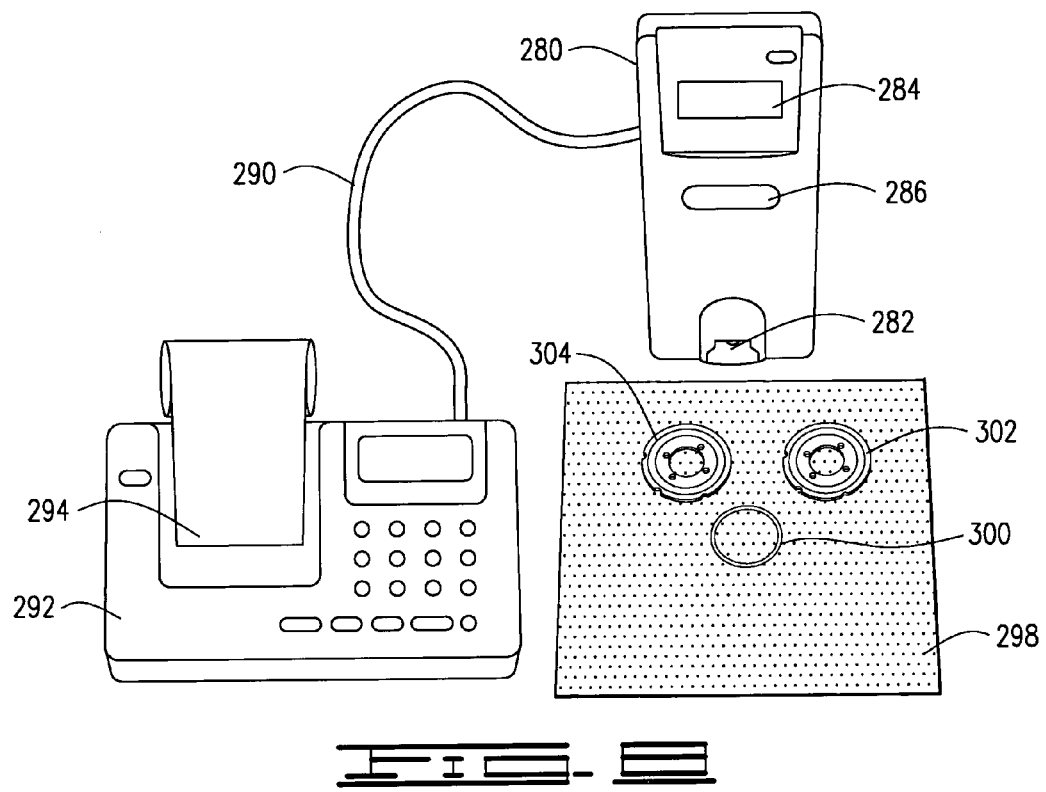
FIG. 8 illustrates equipment for comparing an initial pressure pattern to a reference pressure pattern.

In FIG. 8, An optical densitometer 280 includes an optical density sensor 282, an optical density readout 284 and a switch 286 that is actuated by an operator to take a reading of optical density. The optical densitometer 280 is coupled by an electrical cable 290 to a computing device 292 that includes a printer 294. A sheet of film 298 includes a pressure pattern 300 that records the maximum pressure exerted by a disc clamp such as disc clamps 302, 304.

Figure 9:
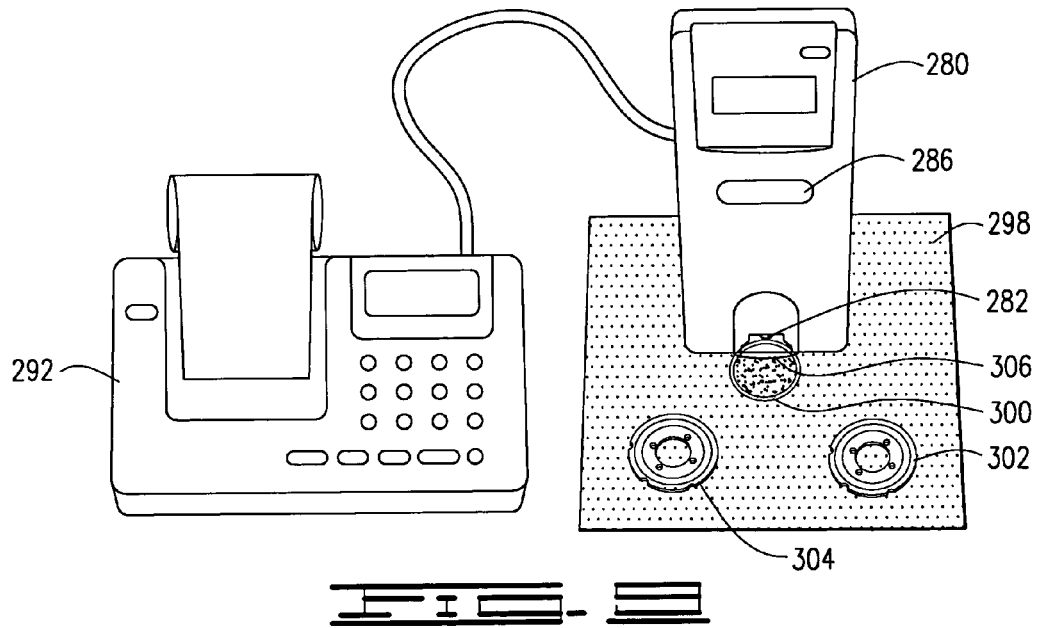
FIG. 9 illustrates a typical test setup for making densitometer measurements of a pressure pattern for a disc clamp.

In FIG. 9, the equipment shown in FIG. 8 is arranged in an operating position. Reference numbers used in FIG. 9 that are the same as reference numbers used in FIG. 8 identify the same features. As can be seen in FIG. 9, the density sensor 282 is placed over a location on the pressure pattern 300 for making a measurement. A clear window 306 on the densitometer 280 provides the operator with a clear view of the location of the density sensor 282 in relation to the pressure pattern 280. Once the operator achieves the desired alignment, then the switch 286 is depressed to capture data and transfer the data to the computing device 292.

Figure 10:
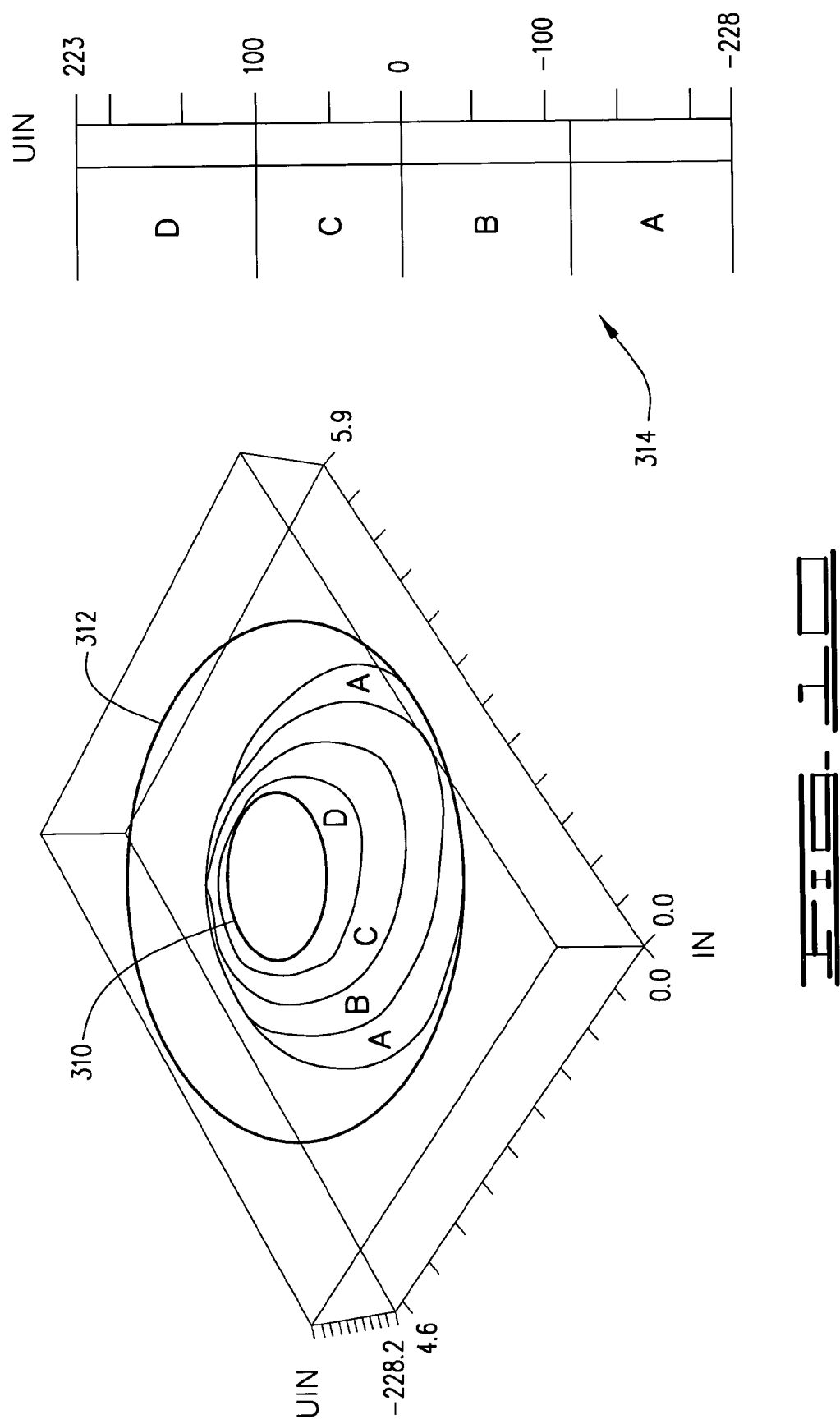
FIG. 10 illustrates a conning profile of the top disc surface illustrated in FIG. 8.

FIG. 10 illustrates a conning profile of the top surface of the disc 246 illustrated in FIG. 5 when the disc clamp 244 is distorted. The disc clamp 244 is a key component of the hard-disk drive, the flatness of which affects the drive functionality. Slight change in flatness would result in distortion of the disc conning pattern. In FIG. 10, the position of the disc 246 is represented by an outer rim 310 and an inner rim 312. Distortions, or deviations from a flat disc surface are represented by regions A, B, C, D, on the disc 246. A scale 314 correlates distortions above (regions C, D) and below (regions A, B) with numerical ranges in microinches.

As can be seen in FIG. 10, the use of a disc clamp 244 that is distorted can cause conning of the disc in the range of about plus and minus 200 microinches. Conventional inspection of flatness and coplanarity of a disc stack using a coordinate measuring machine (CMM) does not adequately capture minute, localized defects such as that illustrated in FIG. 10. However, the present method of physical measurement of the contact pressure patterns at the clamp to disc interface finds the defect and corrects it. The flatness controlled was typically less than 0.002" for the contact datum which was measured by co-ordinate measuring machine (CMM). However, this inspection criteria does not reveal small and localized defect on the clamp contact surface. A clamp that passed the conventional inspection process can create excessive distortion (conning profile) that affects the flyability of magnetic head.

In a preferred method, a sheet of a selected pressure sensing film is cut to size. The pressure sensing film is placed between the disc 246 and the disc clamp 244. An initial clamping load is applied by tightening the fasteners 248. The fasteners 248 are removed, the disc clamp 244 is removed and the sheet is removed as illustrated in FIG. 7 and inspected under 10× magnification. High and low points of the pressure pattern are marked and densitometer measurements are taken at those points. The pressure levels are computed and is fed back to the manufacturing process to adjust the tightening of the fasteners.

The use of pressure indicating film together with an inspection fixture (to preload the clamp with specific force) allows detection and correction of localized defect in the clamp's contact surface (due to issue with the fabrication tooling for the clamp). A better capability for improving the disc conning results.

Figure 11:
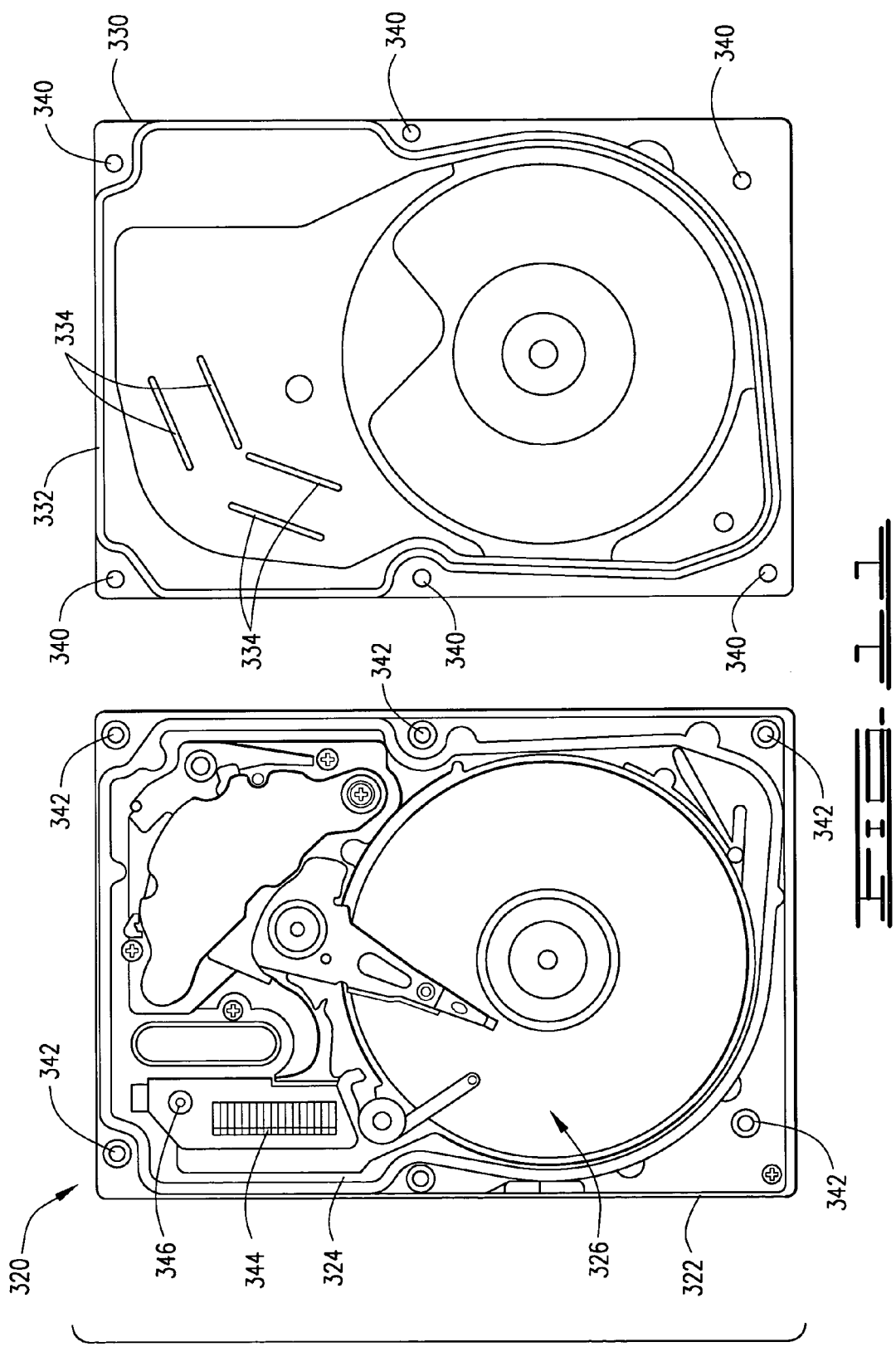
FIG. 11 illustrates an exploded view of a disc drive.

FIG. 11 illustrates a view of a disc drive 320. The disc drive 320 includes a die cast base 322 that includes an upper surface 324 that is nominally flat and serves as a sealing surface surrounding a disc drive cavity 326. The disc drive 320 also includes a voice coil motor pole shoe with an upper surface 328 that is nominally flat and serves a sealing surface. A disc drive cover 330 includes a continuous resilient gasket 332 that mates with the upper surface 324 to form a seal for the disc drive cavity 326. The disc drive cover 330 also included gaskets 334 that mate with upper surface 328 to control air flow in the disc drive cavity 326. Screws or other fasteners (not illustrated) pass through holes 340 in the disc drive cover 330 and are threaded into threaded holes 342 in the die cast base 322. The screws are tightened to provide a compressive force that generates a pressure pattern between the gaskets 332, 334 and the mating gasket surfaces 324, 328.

The die cast base 322 includes a through hole (as explained above in connection with FIG. 5). A printed circuit cable header 344 covers the through hole and is sealed to the through hole by a through hole gasket (not illustrated). The through hole gasket is compressed by fasteners 346. The sealing of the through hole gasket can be controlled (as illustrated in FIG. 2) using a film that is sensitive to pressure.

Figure 12:
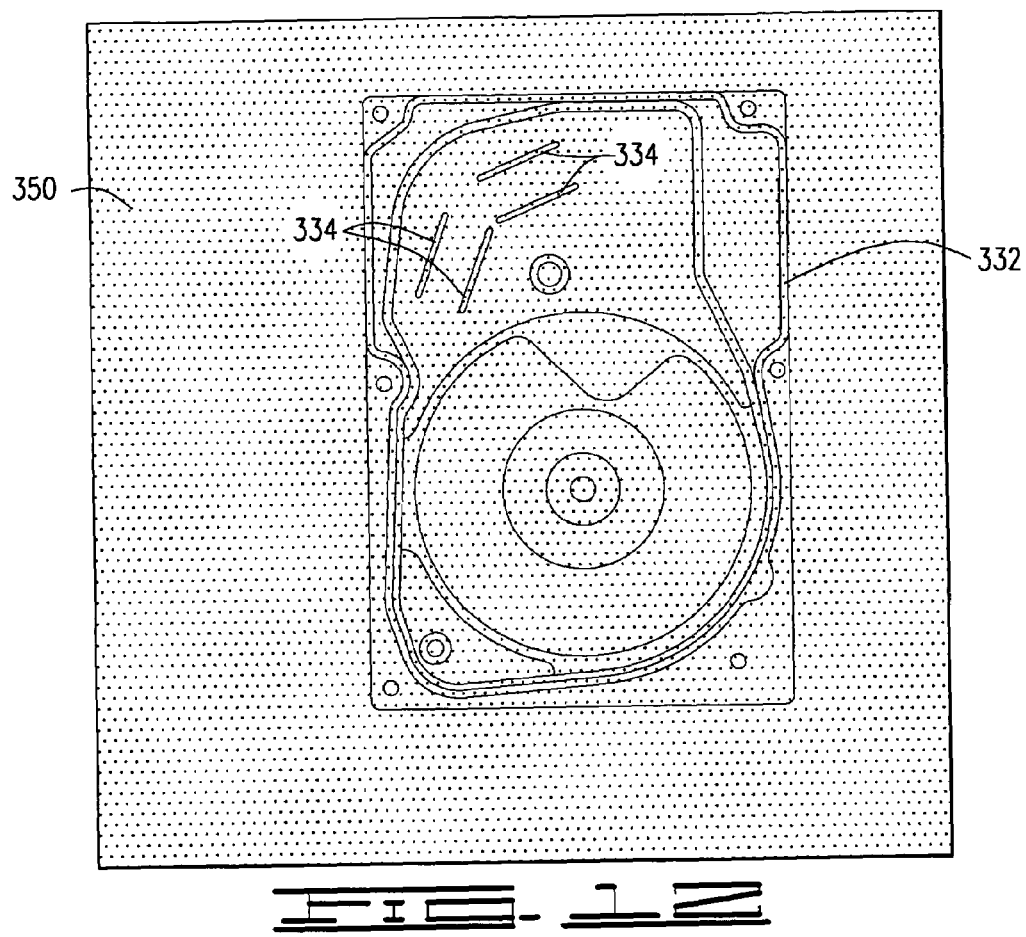
FIG. 12 illustrates a disc drive top cover and a film that has been subjected to a pressure pattern between a disc drive top cover gasket and a disc drive housing.
Figure 13:
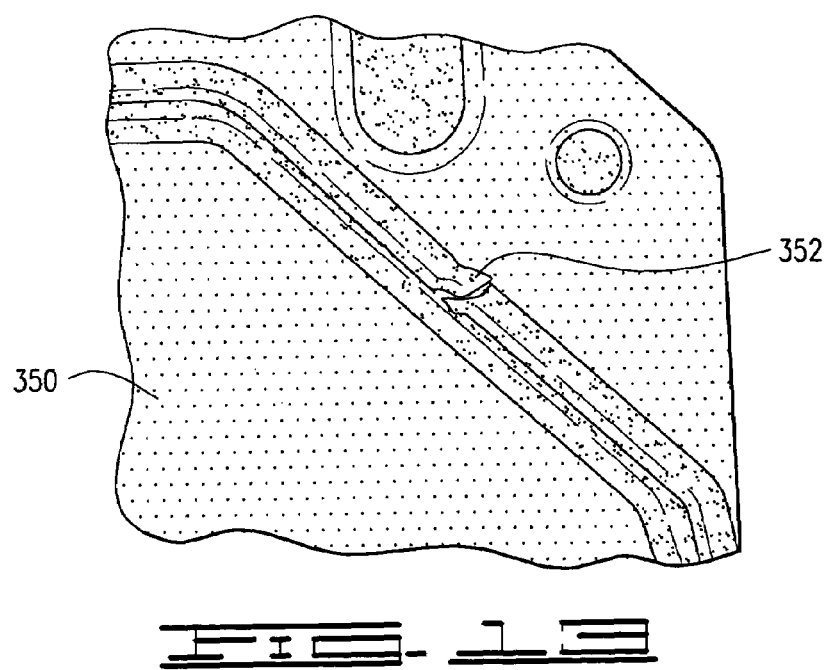
FIG. 13 illustrates an enlarged view of a defect in a top cover gasket.

As illustrated in FIG. 12, a sheet 350 of pressure sensing film has been compressed between the gaskets 332, 334 on the cover 330 and the mating surfaces 324, 328 (FIG. 11) and then removed for testing of optical properties. An enlarged view of the gasket 332 in the cover 330 is illustrated in FIG. 13 and reveals an irregularity or localized defect or tear 352 of a type that can be found using optical density sensing but which is otherwise difficult to locate. The information concerning this flaw is then fed back into the manufacturing system to locate the source of the flaw and make adjustments to reduce recurrence of the flaw in the future. The defect 352 may be due a tear, molding problem or other defect which reduces the post assembly compression of the gasket and may cause leaks that are not detectable by visual inspection, which is the primary method of screening.

The use of pressure indicating film technique (together with a fixture using the initial configuration of the drives fasteners) allows quality control engineer to record the pre-compression pressure distribution in a statistical manner to detect drift in gasket performance as well to detect localized defect due to other assignable causes.

Figure 14:
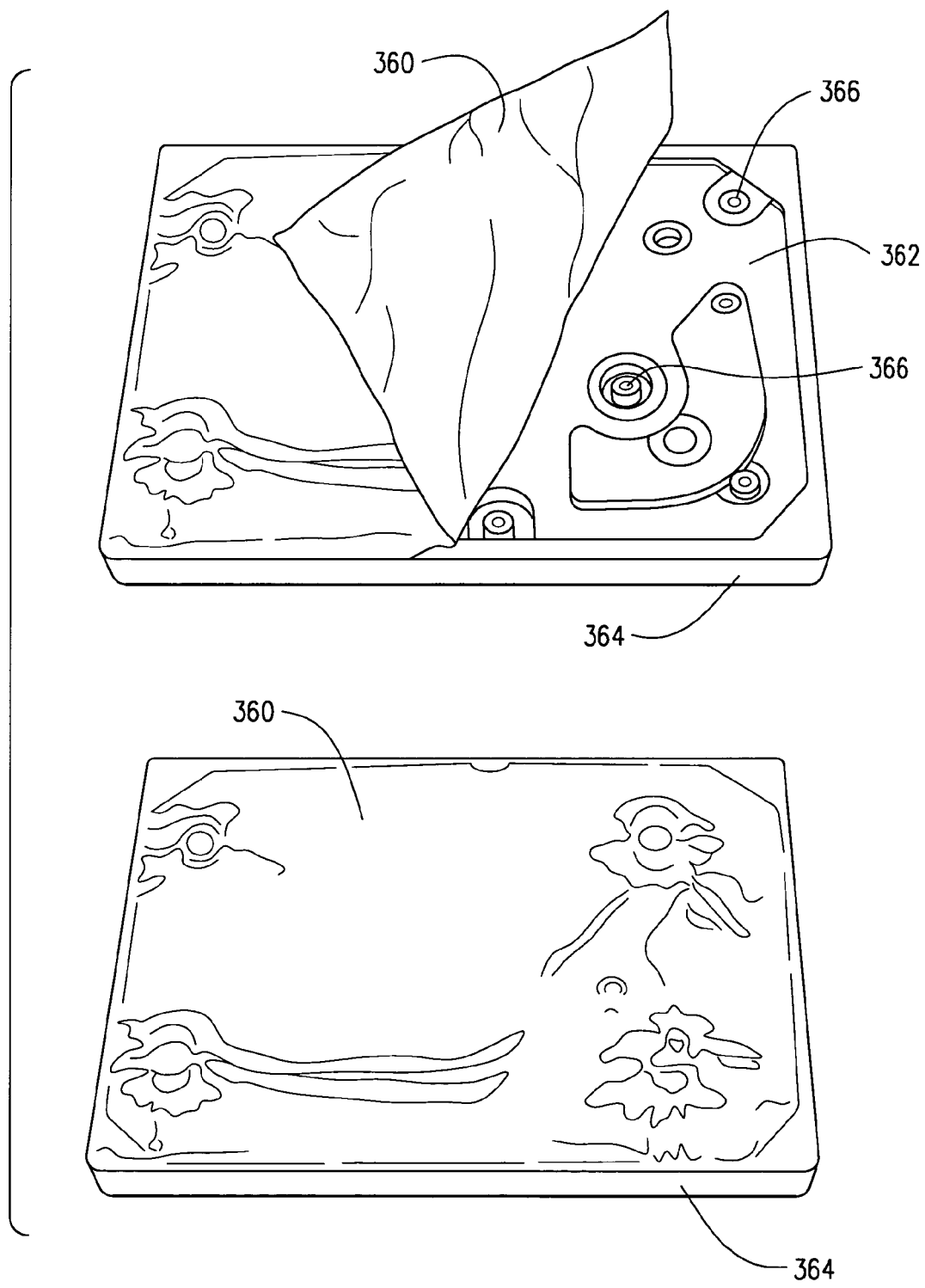
FIG. 14 illustrates a label seal applied to a disc drive using a roller.

FIG. 14 illustrates two views of a cover seal 360 for a bottom surface 362 of a head-disc assembly 364. The cover seal 360 is preferably an adhesive-backed foil label that is automatically applied to a head-disc assembly 364 by an automatic labeling machine (not illustrated). The automatic labeling machine includes a cylindrical resilient roller that rolls over the foil label to compress the adhesive and provide a seal for various fasteners 366 accessible at the bottom surface 362. The hardness of the roller, the downward compressive force on the roller, alignment and other factors affect the quality of the sealing by the adhesive. Improper distribution of pressure over the entire surface of the label would usually result in air bubbles trapped at different location, which subsequently create leakage paths.

Pressure sensing film is cut to the size of the top cover label and applied to the head-disc assemblies (in place of the label) going through the labeling machine. The resulting pressure pattern is used to control the final adjustment of the labeling speed, air pressure setting for the compressive force, material selection for the roller and other parameters to achieve the optimum seal condition through the use of feedback. Periodic testing using this technique allows the maintenance engineer to conduct preventive maintenance before defective drives are produced.

Figure 15:
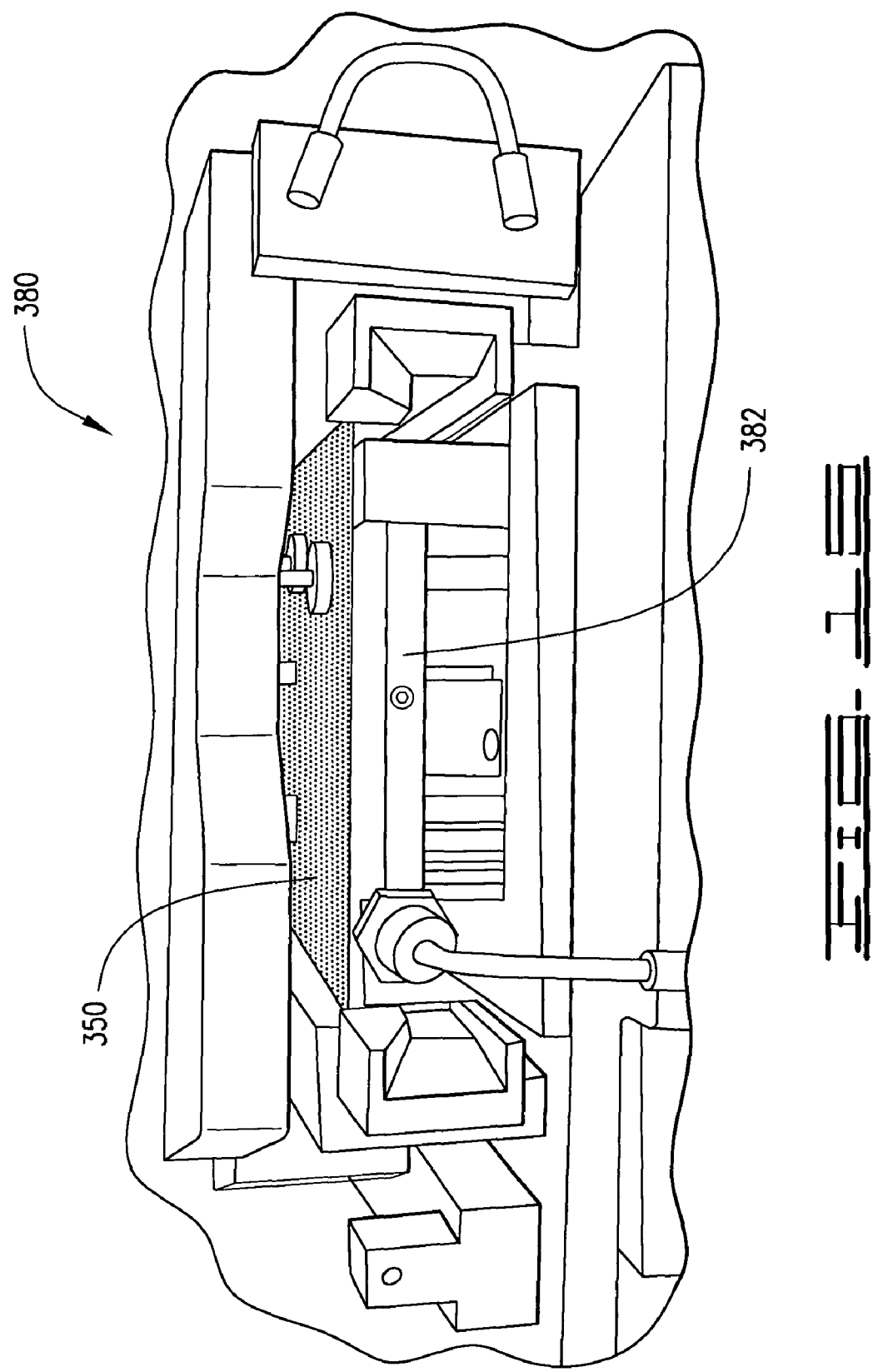
FIG. 15 illustrates a clamping arrangement in a manufacturing fixture for a disc drive.

FIG. 15 illustrates a clamping arrangement in a manufacturing fixture 380 for a disc drive 382. The manufacturing fixture 380 is used to hold the disc drive 382 securely while servopatterns are written on magnetic media in the disc drive.

The hard-disk drive 382 uses the servo-pattern on the magnetic media to create a reference for the drive code. This process of servo writing requires proper clamping of the drives via various mechanical-clamping devices such as spring plunger, air cylinder, and other mechanisms in the manufacturing fixture 380.

When these clamping forces are too low, excessive drive vibration results. When these clamping forces are too high, distortion of the drive assembly results. These clamping forces to the drives are difficult to measure because of the complexity of the fixture 380. Pressure sensing film is loaded at the interfaces of the drive and clamping devices to allow direct quantification of the contact force intensity. The total clamping force is then further computed from the color intensity imprint using the basic formula (Force=integration of Pressure×dA). A color scanner scanned the imprint image and computation for the total clamping force is built-in as calculation features of the image processing software.

In summary, an apparatus (such as 150) and method of setting a compressive force in an assembly (such as 160) are disclosed. A film (such as 162) is placed between first and second contacting surfaces (such as 154, 156) in the assembly. The film has an optical property responsive to a pressure pattern between the first and second contacting surfaces. A compressive force (such as 152) is provided at an initial level to the first and second contacting surfaces to generate an initial pressure pattern. The compressive force is removed, and the film is removed from between the first and second contacting surfaces. An optical sensor (such as 170) senses the optical property to derive a sensed initial pressure pattern (such as 172). A stored setting (such as 174) is provided to control a compressive force generator (such as 166). A comparator (such as comparator 176) compares the sensed initial pressure pattern to a reference pressure pattern (such as 180) and updates the stored setting to adjust the compressive force as a function of the comparing.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the compressive force setting system while maintaining substantially the same functionality without departing from the scope and spirit of the present invention. In addition, although the preferred embodiment described herein is directed to an automated system for setting compressive force, it will be appreciated by those skilled in the art that the teachings of the present invention can be applied to system with varying degrees of automation ranging from completely manual to completely automatic, without departing from the scope and spirit of the present invention.

What is claimed is:

1. A method of setting a compressive force in an assembly, comprising:
    placing a film between first and second contacting surfaces in the assembly, the film having an optical property responsive to a pressure pattern between the first and second contacting surfaces;
    providing the compressive force at an initial level to the first and second contacting surfaces to generate an initial pressure pattern;
    removing the compressive force and removing the film from between the first and second contacting surfaces;
    sensing the optical property to derive a sensed initial pressure pattern;
    providing a stored setting in a computer, the stored setting controlling the compressive force; and
    updating the stored setting as a function of the computer comparing the sensed initial pressure pattern to the reference pressure pattern, wherein the function of the comparing comprises a statistical process control function so that the stored setting changes in response to shifts in average optical density.

2. The method of claim 1, wherein the optical property is sensed by an optical densitometer providing a densitometer reading.

3. The method of claim 1 wherein the film has thickness that is less than 120 micrometers.

4. The method of claim 1, wherein the first contacting surface is a disc clamp surface, the second contacting surface is a disc surface, and the sensed initial pressure pattern diagnoses a surface defect.

5. The method of claim 1, wherein the assembly includes a cavity and the first and second contacting surfaces seal the cavity.

6. The method of claim 1, wherein the first contacting surface is a cover gasket surface, the second contacting surface is a housing surface, and fasteners provide the compressive force.

7. The method of claim 1, wherein the first contacting surface is a printed circuit cable header gasket surface, the second contacting surface is a housing surface, and fasteners provide the compressive force.

8. The method of claim 1, further comprising:
    diagnosing a defect in at least one of the first and second contacting surfaces as a function of the sensed initial pressure pattern.

9. The method of claim 1, wherein the first contacting surface is a label surface and the second contacting surface is a roller surface that is movable over the label surface.

10. The method of claim 1, wherein the first contacting surface is a manufacturing fixture clamp surface, the second contacting surface is a disc drive housing surface, and a manufacturing fixture provides the compressive force.

11. The method of claim 1, wherein the first contacting surface is a leak tester gasket surface, the second contacting surface is a housing surface, and a test fixture provides the compressive force.

12. An apparatus that sets a compressive force between first and second contacting surfaces in an assembly, comprising:
    a film between the first and second contacting surfaces, the film having an optical property responsive to a pressure pattern between the first and second contacting surfaces;
    a compressive force generator applying a compressive force at an initial level to the first and second contacting surfaces to generate an initial pressure pattern;
    an optical sensor sensing the optical property to derive a sensed initial pressure pattern; and
    a computer comprising:
        a stored setting controlling the compressive force; and
        a comparator comparing the sensed initial pressure pattern and a reference pressure pattern and the computer updating the stored setting to adjust the compressive force as a function of the comparing, wherein the function of the comparing comprises a statistical process control function so that the stored setting changes in response to shifts in average optical density.

13. The apparatus of claim 12, wherein the optical sensor comprises an optical densitometer providing a densitometer reading.

14. The apparatus of claim 12 wherein the film has thickness that is less than 120 micrometers.

15. The apparatus of claim 12, wherein the first contacting surface is a disc clamp surface, the second contacting surface is a disc surface, and the sensed initial pressure pattern diagnoses a surface defect.

16. The apparatus of claim 12, wherein the assembly includes a cavity and the first and second contacting surfaces seal the cavity.

17. The apparatus of claim 12, wherein the first contacting surface is a cover gasket surface, the second contacting surface is a housing surface, and fasteners provide the compressive force.

18. The apparatus of claim 12, wherein the first contacting surface is a printed circuit cable header gasket surface, the second contacting surface is a housing surface, and fasteners provide the compressive force.

19. The apparatus of claim 12, wherein the first contacting surface is a label surface and the second contacting surface is a roller surface.

20. The apparatus of claim 12, wherein the first contacting surface is a manufacturing fixture clamp surface, the second contacting surface is a disc drive housing surface, and a manufacturing fixture provides the compressive force.

21. The apparatus of claim 12, wherein the first contacting surface is a leak tester gasket surface, the second contacting surface is a housing surface, and a test fixture provides the compressive force.

22. An apparatus that sets a compressive force between first and second contacting surfaces in an assembly, comprising:
    a film between the first and second contacting surfaces, the film having an optical property responsive to a pressure pattern between the first and second contacting surfaces;
    a compressive force generator applying a compressive force at an initial level to the first and second contacting surfaces to generate an initial pressure pattern; and
    a sensor sensing the optical property to derive a sensed initial pressure pattern; and
    computer means including a computer for storing a setting controlling the compressive force and for comparing the sensed initial pressure pattern to a reference pressure pattern and for updating the stored setting to adjust the compressive force as a function of the comparing, wherein the function of the comparing comprises a statistical process control function so that the stored setting changes in response to shifts in average optical density.

23. The apparatus of claim 22, wherein the assembly includes a cavity and the first and second contacting surfaces seal the cavity.

24. The apparatus of claim 22, further comprising: diagnosing a defect in at least one of the first and second contacting surfaces as a function of the sensed initial pressure pattern.

25. The apparatus of claim 22, wherein the optical property is sensed by an optical densitometer providing a densitometer reading.

26. A method of setting a compressive force in an assembly, comprising:

placing a film between first and second contacting surfaces in the assembly, the film having an optical property responsive to a pressure pattern;

providing the compressive force at an initial level to the first and second contacting surfaces to generate an initial pressure pattern;

removing the compressive force and removing the film from between the first and second contacting surfaces;

sensing the optical property with an optical sensor to derive a sensed initial pressure pattern;

providing a stored setting in a computer, the stored setting controlling the compressive force; and updating the stored setting as a function of the computer comparing the sensed initial pressure pattern to the reference pressure pattern, wherein the function of the comparing comprises a statistical process control function so that the stored setting changes in response to shifts in average optical density to maintain a normal distribution of sensed pressure patterns over time.

27. The method of claim 26 and further comprising:

controlling conning of a disc of magnetic media with the updating of the stored setting.

28. The method of claim 26 and further comprising:

inspecting the sensed initial pressure pattern for high and low points of the pressure pattern;

marking the high and low pressure points; and taking densitometer measurements and the marked high and low pressure points.

* * * * *